United States Patent [19]

Oshiba

[11] Patent Number: 5,416,309
[45] Date of Patent: May 16, 1995

[54] INFORMATION REGENERATING APPARATUS FOR AN OPTICAL RECORDING MEDIUM

[75] Inventor: Mitsuo Oshiba, Tokyo, Japan

[73] Assignee: Olympus Optical Co., Ltd., Tokyo, Japan

[21] Appl. No.: 12,134

[22] Filed: Feb. 1, 1993

[30] Foreign Application Priority Data

Feb. 4, 1992 [JP] Japan .................................. 4-019185

[51] Int. Cl.⁶ ............................................. G11B 7/08
[52] U.S. Cl. ..................................... 235/454; 369/59; 369/124
[58] Field of Search ............... 235/454, 436, 466, 474, 235/487, 494, 440; 369/59, 48, 54, 124

[56] References Cited

U.S. PATENT DOCUMENTS

| | | | |
|---|---|---|---|
| 4,896,309 | 1/1990 | Yamakawa et al. | 369/48 X |
| 5,060,208 | 10/1991 | Nagai et al. | 369/124 X |
| 5,253,243 | 10/1993 | Suzuki | 369/48 X |
| 5,267,226 | 11/1993 | Matsuoka et al. | 235/454 |

FOREIGN PATENT DOCUMENTS 3-69069  3/1991  Japan .

*Primary Examiner*—John Shepperd
*Attorney, Agent, or Firm*—Armstrong, Westerman, Hattori, McLeland & Naughton

[57] ABSTRACT

In compliance with a variation in the speed of relative movement between a reciprocating optical recording medium and an optical head, an information regenerating apparatus produces a bit clock precisely and regenerate information correctly. To achieve this purpose, in this apparatus, information regenerating light receiving elements produce preceding and succeeding signals with a time difference between them. Based on a preceding one of the signals, a pulse spacing sampling circuit, a pulse multiple detecting circuit, a memory circuit, and a reference period calculating circuit produce a reference period. Based on a succeeding signal, a circuit for generating a signal to be demodulated produces a demodulated signal. Based on the reference period and a synchronizing signal, a demodulating circuit uses the bit clock generated by the clock generating circuit to demodulate the data carried on the signal to be demodulated.

12 Claims, 7 Drawing Sheets

INFORMATION REGENERATING APPARATUS FOR AN OPTICAL RECORDING MEDIUM

BACKGROUND OF THE INVENTION

1. Field of the Invention

The present invention relates to an information regenerating apparatus for an optical recording medium that regenerates information using an optical card as an optical recording medium.

2. Description of the Prior Art and Related Art

In an optical information recording/regenerating apparatus using an optical card as an optical recording medium, an optical card having multiple tracks, which are parallel with one another, and an optical head for optically recording or regenerating information on or from the optical card are moved relatively in the direction of extension of tracks to record or generate information.

In general, in an optical information recording/regenerating apparatus using a disk type optical medium such as an optical disk, rotation causes information to be recorded or regenerated. The speed of relative movement between the optical recording medium and optical head is relatively constant. On the contrary, in an optical information recording/regenerating apparatus using an optical card, the optical card is reciprocated to record and/or regenerate information. Therefore, the speed of relative movement between the optical card and optical head varies relatively largely. In this kind of optical recording/regenerating apparatus, when information is recorded and/or regenerated, the variation in speed must be taken into consideration. In particular, when information, which has been modulated using a modified frequency modulation (MFM) method, a (2, 7) modulation method, or other self-clock modulation method, then recorded, is to be generated, the variation in speed must be taken account to generate a bit clock for demodulation.

For example, in an apparatus described in Japanese Patent Laid-Open No.3-69069, the pulse spacings of pulses making up a binary-coded signal are measured and averaged to work out a reference period. Based on the reference period, a bit clock is generated and demodulated. Thus, a variation in speed is canceled out.

FIG. 1 is a circuit block diagram showing a major portion of an information regenerating apparatus described in the above patent publication.

The regenerating apparatus supplies a binary-coded signal to a pulse spacing sampling means 31 and to a synchronizing means 32. The pulse spacing sampling means 31 subsequently measures the pulse spacings of a train of pulses making up the binary-coded signal, then supplies the measured pulse spacings to a pulse multiple detecting means 33. The pulse multiple detecting means 33 detects how many times each of the pulse spacings sent from the pulse spacing sampling means 31 is as long as a reference period T, then supplies the detected multiples to a reference period calculating means 34. The reference period calculating means XY4 uses the pulse spacings of several pulses and their multiples relative to the reference period T to calculate a new reference period T', then supplies the reference period T' to a clock generating means 35. The reference period T' is also supplied as a reference period for detecting the next pulse multiple to the pulse multiple detecting means 33.

The reference period T' is an average obtained by dividing the sum of pulse spacings of several pulses by the sum of their pulse multiples.

The clock generating means 35 uses a period based on the reference period T' sent from the reference period calculating means 34 to generate a bit clock for demodulating a pulse train making up a binary-coded signal.

On the other hand, the synchronizing means 32 produces a required synchronizing signal using the binary-coded signal, the bit clock sent from the clock generating means 35, and the period T', then supplies the synchronizing signal to the clock generating means 35. The clock generating means 35 generates a bit clock so that the bit clock will be synchronized with the binary-coded signal at intervals of given pulse widths. This enables regeneration of a bit clock that moderately catches up with a variation in the speed of relative movement between an optical recording medium and a regeneration head.

FIG. 2 shows a curve plotted with the time on the axis of abscissas and with the speed of relative movement between an optical recording medium and a regeneration head on the axis of ordinates, indicating variations in the speed of relative movement.

When that pulse of a binary-coded signal at a point P is demodulated, assuming that a bit clock is generated using, as shown in FIG. 2, the pulse spacings of a pulse train of the binary-coded signal in a region R2 through which the binary-coded signal has passed before the point P. In this case, all average speed of relative movement between an optical recording medium and a regeneration head becomes V2. V2 differs from the speed of relative movement, V1, actually measured at the point P. To produce a correct bit clock in consideration of a variation in the speed of relative movement, pulse spacings of a pulse train making up a binary-coded signal and falling in a region R1 centered on the point P must be used in calculation to generate a bit clock.

In the foregoing apparatus described in the above patent publication, pulse spacings of a pulse train in a region R2 in FIG. 2 are used in calculation to generate a bit clock. This means that the period for a bit clock is determined based on a value difference from the speed of relative movement measured actually at the point P. A proved solution has not been presented on how to produce a precise bit clock, which is used for regenerating information correctly, by coping with a variation in the speed of relative movement between an optical recording medium and a regeneration head.

The grantee of the present invention, which is a corporation, has proposed a dual light source type optical information recording/regenerating apparatus having a photodetector constructed as shown in the related art of FIG. 3 by filing Japanese Patent Application No.3-260755.

The dual light source type optical information recording/regenerating apparatus comprises a light source for generating an information recording light beam and a light source for generating an information regenerating light beam which are independent of each other. While the information recording light beam is recording information on an optical recording medium, an information regenerating light beam regenerates the recorded information, and performs verification; that is, checks the acceptability of the recording.

For verification, a single light source type apparatus scans a light beam spot twice over tracks formed on an optical recording medium. Compared with the single light source type apparatus, the dual light source type apparatus permits an actual recording speed that is twice as fast.

The dual light source type apparatus can stabilize the quantity of light from the light source for information regeneration. Therefore, the information regenerating light beam can be used to produce a signal for focus servo control or tracking servo control. Therefore, while recording information, the dual light source type apparatus permits stable servo control.

FIG. 3 shows a construction of a photodetector employed for the dual light source type optical information recording/regenerating apparatus described in the aforesaid related art. In FIG. 3, a spot image of a recording light beam, and spot images of the zero-order diffracted light and first-order diffracted light of a regenerating light beam, which are projected on the photodetector, are drawn with solid lines, while the state of an optical recording medium opposed to the photodetector is drawn with dashed lines.

In FIG. 3, an alphanumeric character 23a denotes a spot image of an information recording light beam. 25b denotes a spot image of the zero-order diffracted light of an information regenerating light beam. 25e and 25f denote spot images of first-order diffracted light.

The photodetector includes signal regenerating light receiving elements 95, 96, and 97, and tracking light receiving elements 91, 92, 93, and 94, and receives light reflected from the spot image 23a. In the photodetector, a signal regenerating light receiving element 98 is installed at a position at which the image 25e of the spot 25d marked by the first-order diffracted light is formed.

In the photodetector having the foregoing construction, when information is regenerated normally, each pair of the tracking light receiving elements 91 and 92, and 93 and 94 detect a positional change of the image of a guide track resulting from displacement of a track as a variation in the quantity of received light, then generates a tracking error signal. Each of the signal regeneration light receiving elements 95, 96, and 97 detects the presence or absence of a pit on each of three tracks as a variation in the quantity of light, then detects a regenerative signal.

In information recording, when an optical card moves in an arrow-a direction (hereafter, forward direction), first, a pit 22a formed by the information recording light beam spot 23a is scanned by an optical head. Then, when the pit 22 reaches a position of the spot 25a, the signal regenerating light receiving element 95 provides an output signal. With the output signal, verification is carried out.

When the optical card 7 moves in an arrow-b direction (hereafter, reverse direction), first, a pit 22 formed by the information recording light beam spot 23 is scanned by the optical head. Then, when the pits 22 reaches the position of the spot 25b, the signal regenerating light receiving element 98 provides an output signal. With the output signal, verification is carried out.

As mentioned above, according to the construction of the photodetector, in whichever direction the optical card moves; in the forward or reverse direction, a regenerative signal can be produced immediately after recording.

When the optical card moves in the forward direction, an output signal of the light receiving element 95 that detects an image of the spot 25d preceding the information recording light beam spot 23a is checked to recognize the state of a track on which the image is to be recorded. When the optical card moves in the reverse direction, an output signal of the light receiving element 98 that detects an image of the spot 25e preceding the information recording light beam spot 23a is checked to recognize the state of a track on which the image is to be recorded. Thus, the state of a track can be recognized immediately before information is recorded.

OBJECTS AND SUMMARY OF THE INVENTION

An object of the present invention is to provide an information regenerating apparatus for an optical recording medium that can produce a precise bit clock, which is used for regenerating information properly, in compliance with a variation in the speed of relative movement between an optical recording means and an optical head.

Another object of the present invention is to provide an information regenerating apparatus for an optical recording medium that can regenerate a bit clock precisely and demodulate data reliably by correctly calculating a speed of relative movement between an optical recording medium and an optical head and by appropriately coping with a change in the direction of reciprocation of the optical recording medium.

Yet another object of the present invention is to provide an information regenerating apparatus for an optical recording medium that can calculate a reference period correctly using a pulse train that includes pulses detected in past times with respect to a certain pulse and pulses to be detected in future times with respect to the pulse.

Yet another object of the present invention is to provide a regenerating apparatus for an optical recording medium that can correctly calculate a speed of relative movement between an optical recording body and an optical head, regenerate a bit clock precisely, and demodulate data reliably, without including a delay circuit in a bit clock regenerating circuit, by generating a bit clock using a preceding one of two-system information regenerative signals originating from two information regeneration light receiving elements which are separated from each other and opposed to the same one track, and by demodulating the other succeeding information regenerative signal using the bit clock.

Still another object of the present invention is to provide a regenerating apparatus for an optical recording medium that can correctly calculate a speed of relative movement between an optical recording medium and an optical head, regenerate a bit clock precisely, and demodulate data reliably, without forming two regeneration light spots, by including a delay circuit, which is cited otherwise in the previous object.

An information regenerating apparatus for an optical recording medium, in which the present invention is implemented, comprises:

an information regenerating light spot forming means that forms information regenerating light spots over tracks on an optical recording medium;

a reference period calculating means that includes information regenerating light receiving elements situated at that positions on a photodetector corresponding to the information regenerating light spots, and that uses an output of one of the information regeneration light elements to calculate a reference period of information recorded on the optical recording medium;

a clock generating means that generates a bit clock with a reference period calculated by the reference period calculating means;

a time difference generating means that creates a time difference between preceding and succeeding outputs of the information regeneration light receiving elements; and a demodulating means that demodulates information using a succeeding pulse train generated by the time difference generating means and a bit clock sent from the clock generating means.

The other features and advantages of the present invention will be apparent from the description below.

BRIEF DESCRIPTION OF THE DRAWINGS

FIG. 4 shows a construction of an optical head used for the information regenerating apparatus;

FIG. 5 is a layout of beam spots on an optical card;

FIG. 6 is an explanatory diagram showing an optical image projected on a photodetector;

FIG. 7 is a block diagram of a bit clock regenerating circuit;

FIG. 8 is a timing chart for a bit clock regenerating circuit; and

DETAILED DESCRIPTION OF THE PREFERRED EMBODIMENTS

Figure 1:
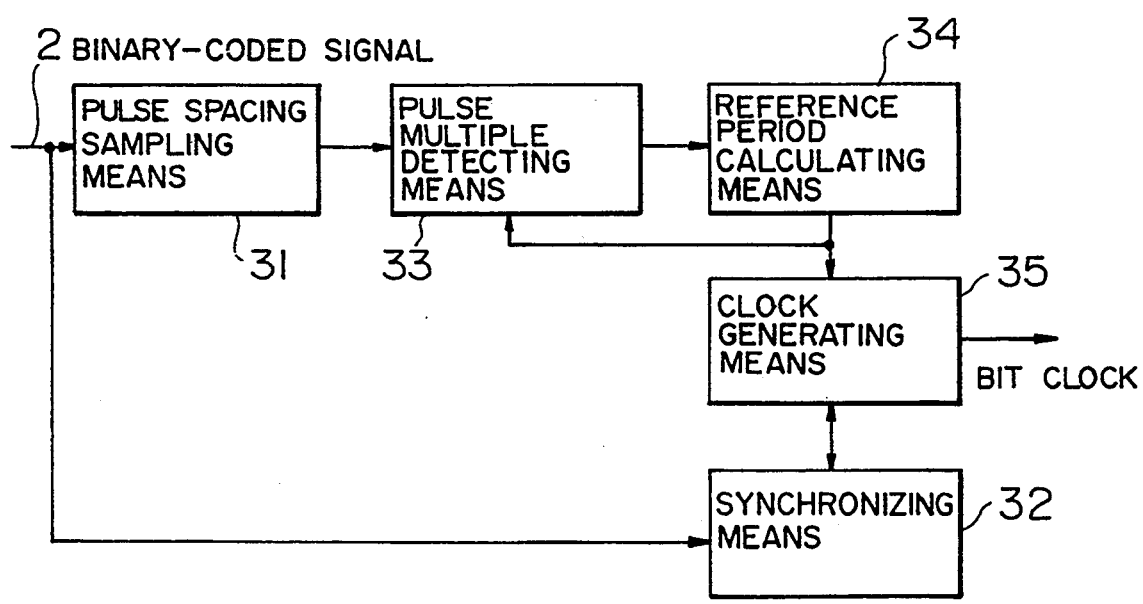
FIG. 1 is a block diagram of a bit clock regenerating circuit of a prior art.
Figure 2:
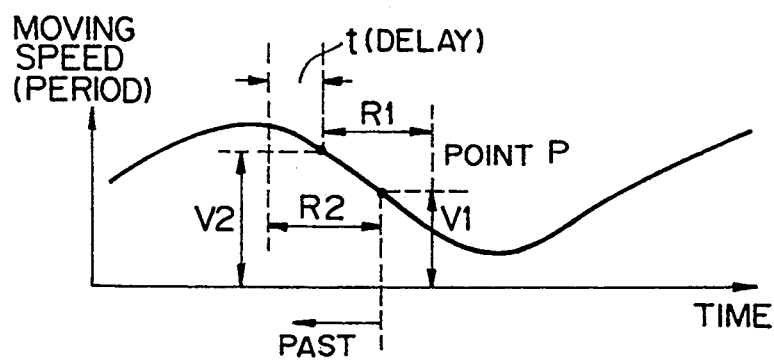
FIG. 2 is an explanatory diagram showing the relationship between the variation in the speed of relative movement and the timing of regenerating a bit clock.
Figure 3:
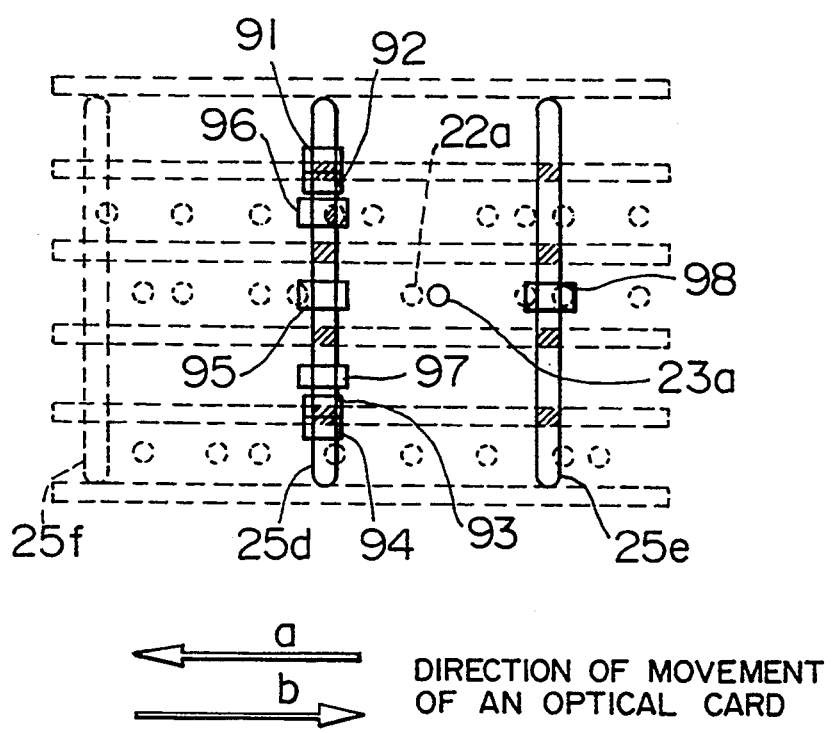
FIG. 3 is an explanatory diagram showing an optical image projected on a photodetector in an information recording/regenerating apparatus of a related art.
Figure 4:
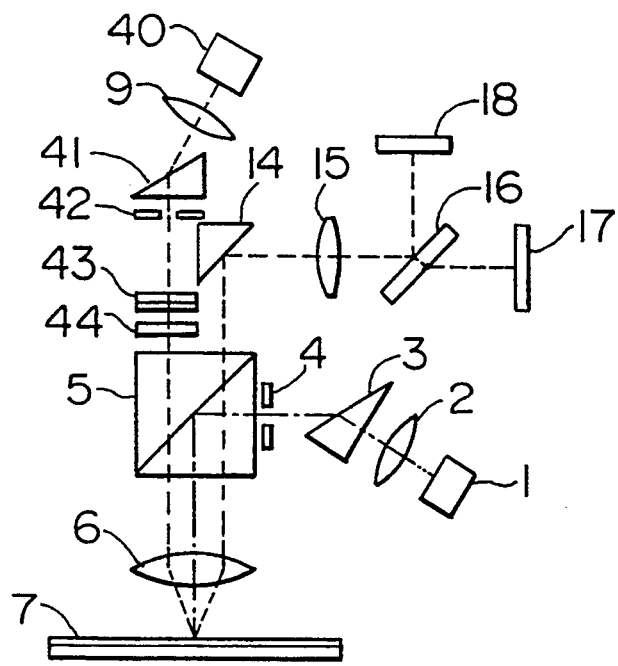
FIGS. 4 to 8 relate to the first embodiment of an information regenerating apparatus of the present invention.

FIG. 4 shows a construction of an optical head for an optical recording/regenerating apparatus of the first embodiment of the present invention. A light beam generated by a semiconductor laser 1 serving as a light source for information recording passes through a collimation lens 2 to become a substantially elliptic beam of parallel rays. The major-axis components of the beam of parallel rays are reduced by a shaping prism 3, whereby the ellipse is shaped substantially like a circle. Thereafter, a circular diaphragm 4 diminishes the diameter of the beam of parallel rays so that the spot size on an optical card or other optical recording medium will be a given size. Then, the beam enters a polarized beam splitter 5. The circular beam for recording consists substantially of S-polarized components, which is characteristic of the semiconductor laser 1. The beam is substantially completely reflected from the reflector of the polarized beam splitter 5, then enters an objective lens 6 along the optical axis thereof. The light is converged by the objective lens 6, and forms a circular spot on an optical card 7. This causes energy density to increase regionally, develops an irreversible thermal change on the recording layer of the optical card 7, and finally forms a recording pit.

On the other hand, a light beam, which is generated from a semiconductor laser 40 installed as a light source for information regeneration independently of the semiconductor laser 1, passes through a collimation lens 9 to become a substantially elliptic beam of parallel rays. Then, the minor-axis components of the elliptic beam are magnified by a shaping prism 41, whereby the ellipse is shaped substantially like a circle. The diameter of the circular beam of parallel rays is reduced by a circular diaphragm 42 so that the spot size on an optical recording medium will be a given size. Then, the circular beam enters a plano-concave cylindrical lens 43.

Only that part of the light beam passing through one side of a plane vertical to the optical axis of the plano-concave cylindrical lens 43 is refracted by the plano-concave cylindrical lens 43, and becomes slightly divergent toward the side. Then, the beam is divided into one beam of zero-order diffracted light and two beams of first-order diffracted light by a diffraction grating 44. The cylindrical lens 43 and the diffraction grating 44 are arranged so that the direction of divergence of the light beam emerging from the cylindrical lens 43 will be perpendicular to the direction of diffraction made by the diffraction grating 44. Each of three beams of the light divided by the diffraction grating 44 consists substantially of P-polarized components, which is characteristic of a semiconductor laser. Almost all of the components are transmitted by the polarized beam splitter 5, then converged by the objective lens 6. Consequently, three spots are formed on the optical card 7. Since the light beam has been made divergent by the cylindrical lens 43, the respective light beam spots formed on the optical card are elongated in their directions of divergence.

Figure 5:
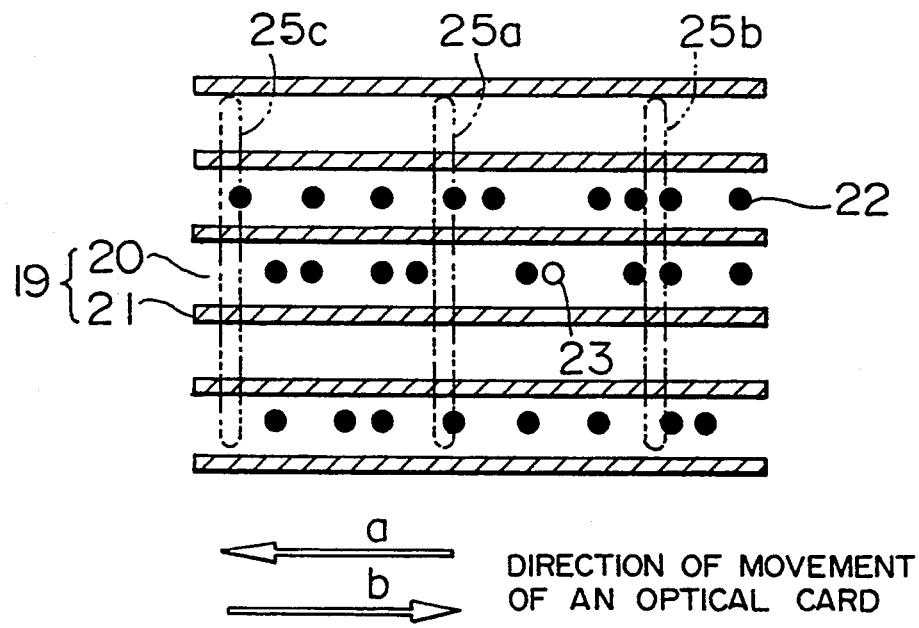

FIG. 5 shows the relationship between a recording light beam spot 23 formed on an optical card 7, and spots 25a, 25b, and 25c formed by the diffracted light of a regeneration light beam. A numeral 19 denotes a track. A numeral 20 denotes an information track on which information is recorded as an array of pits. A numeral 21 denotes a track guide.

The three beam spots are arranged so that the recording light beam spot 23 will be located between the spot 25a formed by the zero-order diffracted light of the regeneration light beam, and either of the spots 25b and 25c formed by the first-order diffracted light. This arrangement is adjusted when an optical lead is assembled and adjusted; that is, by creating a relative angular difference between the optical axes of the recording light beam and regenerating light beam which are about to enter an objective lens 6.

In this apparatus, a cylindrical lens 43 is situated so that the direction of magnifying the regenerating light beam spots 25a, 25b, and 25c will be substantially perpendicular to the direction in which tracks are extending. Therefore, the apparatus can provide the information of multiple tracks at the same time.

The spots 25a, 25c, and 25c formed by the diffracted light of the regenerating light beam are regularly reflected from an optical card 7 while their quantities of light are modulated depending on the presence or absence of a track guide 21 or a pit 22 on the optical card 7. The beams of reflected light are transmitted by the objective lens 6 in the opposite direction, and then routed as substantially parallel rays to a polarized beam splitter 5. These beams of reflected light are composed substantially of P-polarized, because the light has regularly been reflected from the optical card 7. Almost all the components are transmitted by the polarized beam splitter 5, and then routed to a reflecting mirror 14.

Then, after reflected from the reflecting mirror 14, the reflected light is converged by a condenser 15 and halved by a half mirror 16. Then, the beams of the halved light enter a signal regenerating/tracking photodetector 17 and a focus photodetector 18 through the light receiving planes thereof, and project magnified images of the spots. As described above, the regenerating light beam enters the objective lens 6 at a position decentered from the optical axis of the objective lens 6. Therefore, focus detection based on a technique which is referred to as "off-axis detection," is carried out. The focus photodetector 18 is realized with, for example a half-split light receiving element. In this embodiment, the movement of an image of a regenerating light beam spot resulting from out-of-focus can be detected with a differential output of the half-split light receiving element.

Figure 6:
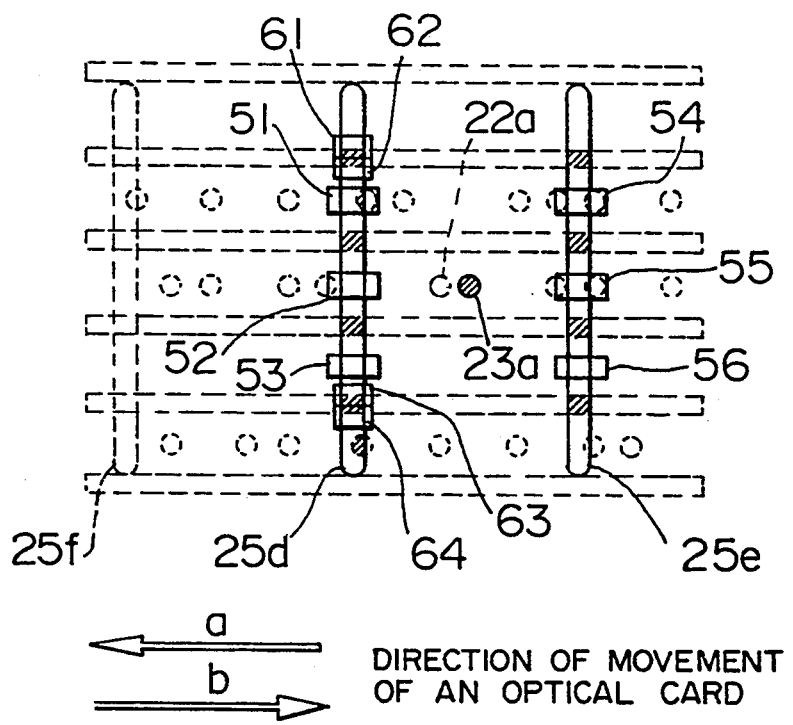

FIG. 6 shows a specific construction of a photodetector 17, and spot images of zero-order and first-order diffracted light of a regenerating light beam projected on the photodetector 17.

On the photodetector 17, signal regenerating light receiving elements 51, 52, and 53, and tracking light receiving elements 61, 62, 63, and 64 are arranged at a position at which an image 25d corresponding to a spot 25a formed by zero-order diffracted light is situated. In addition, magnified images 25d, 25e, and 25f of optical images formed by a regenerating light beam are projected on the photodetector 17 without causing displacement of a track or out-of-focus. Furthermore, signal regenerating light receiving elements 54, 55, and 56 are located at a position at which the image 25e corresponding to a spot 25b formed by first-order diffracted light will be situated when the regenerating light beam forms an image at a correct position over the light receiving elements 51, 52, and 53.

Each member of the pairs of the tracking light receiving elements 61 and 62, and 63 and 64 detects a positional change of an image of a track guide resulting from displacement of a track as a variation in the quantity of received light, and generates a tracking error signal. Each of the signal regenerating light receiving elements 51, 52, and 53, and 54, 55, and 56 detects a variation in the quantity of light to recognize the presence or absence of a pit on each of three tracks, and outputs a regenerative signal.

During information recording, as shown in FIG. 5, the optical card 7 moves in an arrow-a direction (forward). In this state, a pit 22a formed by the recording light beam spot 23 moves toward a spot 25c formed by one beams of the first-order diffracted light of the regenerating light beam. Then, when the pit 22a reaches the position of the spot 25c, the quantity of light in the signal regenerating light receiving element 52 on the photodetector 17 varies to output a regenerative signal. Thus, a regenerative signal is produced immediately after recording. Based on the regenerative signal, verification is carried out.

When the optical card 7 moves reversely or in an arrow-b direction (reverse direction), the pit 22a formed by the recording light beam spot 23 moves toward a spot 25b formed by the other beam of the first-order diffracted light of the regenerating light beam. Then, when the pit 22a reaches the position of the spot 25b, the quantity of light in the signal regenerating light receiving element 55 varies to produce a regenerative signal. Thus, a regenerative signal resulting from a variation in the quantity of light is produced immediately after recording. Based on the regenerative signal, verification is carried out.

As described above, in whichever direction the optical card moves; in the forward or reverse direction, a regenerative signal can be produced immediately after recording. Specifically, irrelevant of the direction of movement of an optical card that reciprocates with respect to an optical head, a regenerative signal is produced immediately after recording, and verification is performed to check the acceptability of recording.

As for reading information from an optical recording medium, when signal regenerating light receiving elements 51, 52, and 53, and 54, 55, and 56, shown in FIG. 6, are employed, each of pits on each of three tracks is detected twice.

In the above description, a light beam from a semiconductor laser 40 is passed through a diffraction grating 44 to generate two light beams, and spots of the two light beams are formed in the direction of extension of tracks. The present invention is not restricted to this technique. For example, two semiconductor lasers may be used but a diffraction grating may not be employed, so that two spots will be formed in the direction of extension of the tracks.

Figure 7:
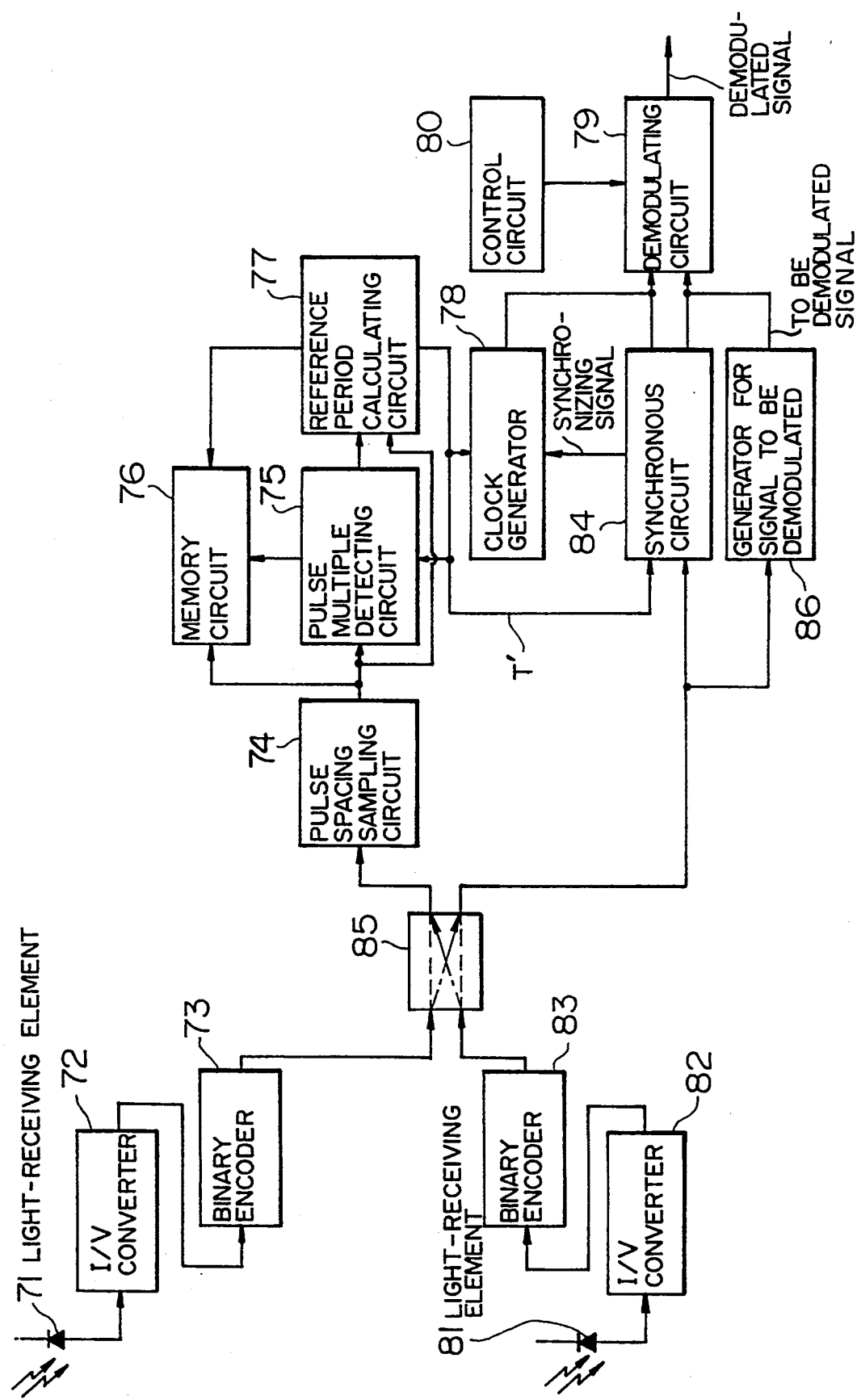

FIG. 7 is a block diagram of a bit clock regenerating circuit employed for a dual light source type optical information recording/regenerating apparatus described previously.

In the description below, an optical card moves in an arrow-a direction in FIG. 6; that is, in a forward direction. A numeral 71 denotes a signal regenerating light receiving element installed on a photodetector 17 and corresponds to, for example, a light receiving element 55. A numeral 81 denotes a signal regenerating light receiving element installed on the photodetector 17, and corresponds to, for example, a light receiving element 52. An image of a pit on the optical card is visualized first by the light receiving element 55, and next by the light receiving element 52. When the optical card moves in the reverse direction, 71 denotes the light receiving element 52, and 81 denotes the light receiving element 55. The light receiving elements 71 and 81 may correspond not only to the light receiving elements 52 and 55 but also to either of the pairs of light receiving elements 51 and 54, and 53 and 56.

Numerals 72 and 82 denote I/V converters that convert signals, which are carried on light received by the light receiving elements 71 and 81, from current to voltage. Numerals 73 and 83 denote binary encoders that convert the outputs of the I/V converters 72 and 82 into binary-coded signals that represent alternate values with respect to a reference level. A numeral 85 denotes a selector for selecting to which the outputs of the binary encoders 73 and 83 should be supplied; a pulse spacing sampling circuit 74 or a synchronous circuit 84 (and a circuit for generating a signal to be demodulated 86), according to the direction of movement of a card.

When an input signal indicating the direction of movement, which is provided by a movement control means for an optical card, represents the forward direction, the selector 85 outputs a signal originating from the light receiving element 71 to the pulse spacing sampling circuit 74, and a signal originating from the light receiving element 81 to the synchronous circuit 84 and to the circuit for generating a signal to be modulated 86. When the input signal represents the reverse direction, the destinations of the signals originating from the light receiving elements 71 and 81 are reversed.

First, a current signal, which is carried on light received by the preceding light receiving element 71, is converted into a voltage signal by the I/V converter 72, and further converted into a pulse train of a binary-coded signal by the binary encoder 73. The pulse spacing sampling circuit 74 uses a counter to count a pulse spacing of one of pulses making up the preceding binary-coded signal that has passed through the selector 85, then supplies the count value p to a pulse multiple detecting circuit 75, a memory circuit 76, and a reference period calculating circuit 77 respectively.

The pulse multiple detecting circuit 75 divides the counted pulse spacing p by a current period T the reference period calculating circuit 77 outputs, thus computing a multiple n representing how many times the pulse spacing p is as long as the period T. Then, the pulse multiple detecting circuit 75 supplies the multiple n to the memory circuit 76 and to the reference period calculating circuit 77.

At the the same time, the memory circuit 76 subsequently stores pulse spacings p sent from the pulse spacing sampling circuit 74, and contains multiple past pulse spacings, say, seven past pulse spacings ($p_{n-7}$, $p_{n-6}$, $p_{n-5}$, ... $p_{n-1}$). The memory circuit 76 subsequently stores multiples n sent from the pulse multiple detecting circuit 75, and contains a plurality of past multiples n, say, seven past multiples ($n_{n-7}$, $n_{n-6}$, $n_{n-5}$, ... $n_{n-1}$).

The reference period calculating circuit 77 calculates the sum between the current pulse spacing $p_n$ supplied by the pulse spacing sampling circuit 74 and seven predetermined sequential pulse spacings $p_{n-7}$, $p_{n-6}$, $p_{n-5}$, ... $p_{n-1}$ existent in the memory circuit 76, and the sum between the current multiple $n_n$ supplied by the pulse multiple detecting circuit 75, and seven predetermined sequential multiples $n_{n-7}$, $n_{n-6}$, $n_{n-5}$, ... $n_{n-1}$ existent in the memory circuit 76. To be more specific, the sum of eight pulse spacings; that is, $pt = p_{n-7} + p_{n-6} + p_{n-5} + ... + p_{n-1} + p_n$, and the sum of eight multiples; that is, $nt = n_{n-7} + n_{n-6} + n_{n-5} + ... + n_{n-1} + n_n$ are provided. The reference period calculating circuit 77 divides the sum of pulse spacings, pt, by the sum of multiples, nt, to calculate a new average period T', then supplies the new average period T' to a clock generator 78 and to a synchronous circuit 84. The reference period calculating circuit 77 also provides the pulse multiple detecting circuit 75 with the new average period T' as a reference period for detecting the next pulse spacing. Thus, the sum of multiple sequential pulse spacings, pt, and the sum of their multiples, nt, are used to calculate a new average period T'. This results in an average period T' that cancels out jitter components of individual pulses.

The clock generator 78 uses an average period T' sent from the reference period calculating circuit 77 and a required synchronizing signal sent from the synchronous circuit 84 to generate a bit clock for demodulating a pulse train of a binary-coded signal. The bit clock is supplied to the synchronous circuit 84 and to a demodulating circuit 79. The bit clock is generated to have a period equivalent of a reference period measured using the preceding binary-coded signal. The phase of the bit clock is shifted, or, re-synchronized by the synchronizing signal locked in the succeeding binary-coded signal. However, re-synchronization is varied depending on the degree of jitter occurring in the succeeding binary-coded signal.

At the same time, a current signal carried on light received by the succeeding light receiving element 81 is converted into a voltage signal by the I/V converter 82, and further converted into a pulse train of a binary-coded signal by the binary encoder 83. The succeeding binary-coded signal is supplied to the synchronous circuit 74 and to the circuit for generating a signal to be demodulated 86 via the selector 85.

The synchronous circuit 84 produces a required synchronizing signal using the succeeding binary-coded signal, the bit clock generated by the clock generator 78, and the period T' provided by the reference period calculating circuit 77, then supplies the synchronizing signal to the clock generator 78. The synchronizing signal matches the phases of the bit clock and of the succeeding binary-coded signal.

The synchronizing signal usually re-synchronizes the bit clock with every incoming pulse of the succeeding binary-coded signal. Depending on the position of an incoming pulse of the binary-coded signal; that is, for a pulse causing intense Jitter, the synchronizing signal is generated with a phase shift or not generated. Thus, the bit clock is synchronized with the succeeding binary-coded signal at intervals of given pulse widths.

The circuit for generating a signal to be demodulated 86 generates a signal to be demodulated so that the signal to be demodulated will rise synchronously with the leading edge of the succeeding binary-coded signal and fall synchronously with the trailing edge of the subsequent bit clock.

The demodulating circuit 79 samples the signal to be demodulated using the bit clock in response to a demodulation start or end instruction sent from the control circuit 80, and demodulates digital data represented with 0s and 1s.

Figure 8:
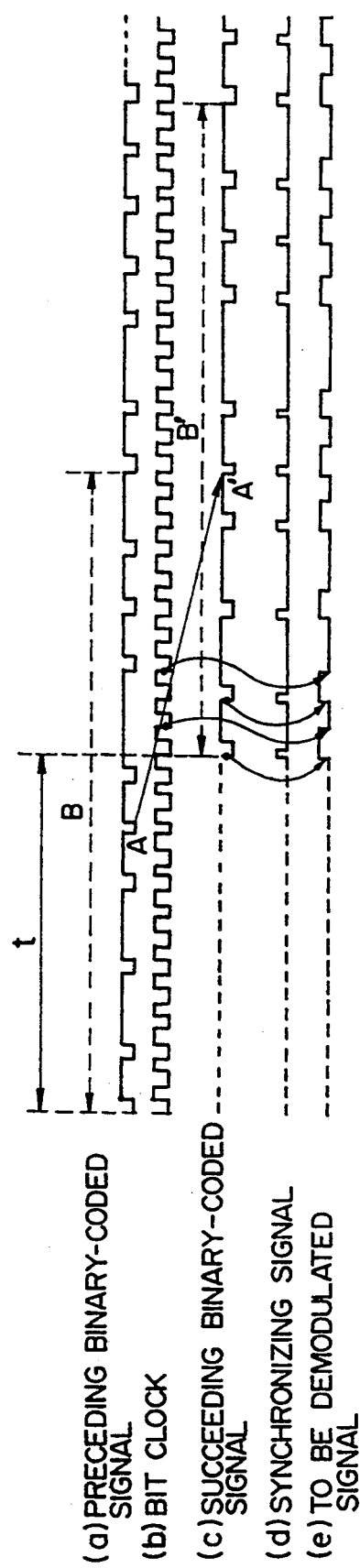

FIG. 8 is a timing chart for explaining the operations of the circuits shown in FIG. 7.

A preceding binary-coded signal (a) in FIG. 8 is used to generate a bit clock (b). On the other hand, a succeeding binary-coded signal (c) is used to generate a synchronizing signal (d) and a signal to be demodulated (e). To be more specific, a train of pulses contained in a region B shown in FIG. 8; that is, a pulse train of a preceding binary-coded signal in the range centered on a pulse A is used to generate a bit clock. Then, a pulse A' of a succeeding binary-coded signal, which corresponds to the pulse A, is demodulated. This demodulation is equivalent to demodulation in which the pulse A' is demodulated using a train of pulses in a region B' centered on the pulse A'.

A time difference between the preceding and succeeding binary-coded signals; that is, a delay t, and the region B (average value of pt) must have a relationship of $t < B$. At this time, a pulse train used for calculating a reference period includes both pulses detected in past times and those detected in future times with respect to a certain pulse. Therefore, compared with a prior art in which only the pulses detected in past times are employed, a reference period can be calculated further correctly. The delay t is calculated using the time interval elapsing after the light receiving element 71 receives light until the light receiving element 81 receives light, and the moving speed of the optical card 7.

$2t = B$ is most preferable. Under this condition, the number of pulses detected in past times becomes substantially equal to the number of pulses detected in future times. In other words, that range (region B) of a binary-coded signal in which pulses are detected and used to calculate a reference period becomes substantially symmetrical with respect to a time base. Therefore, an average period can be calculated precisely.

In the above description, the optical card moves in the forward direction. When the optical card moves in the reverse direction, all that should be done is to switch the destinations of the outputs of the binary encoders 73 and 83 using the selector 85. The subsequent operations are identical to those done when the optical card moves in the forward direction.

In this embodiment, a bit clock is regenerated using a preceding one of two-system information regenerative signals originating from two Information regenerating light receiving elements that are separated from each other and opposed to the same one track. Then, the other succeeding information regenerative signal is demodulated using the bit clock. Therefore, a delay circuit need not be included in a bit clock regenerating circuit, a speed of relative movement between an optical recording medium and an optical head can be calculated correctly, a bit clock can be regenerated precisely, and data can be demodulated reliably.

Figure 9:
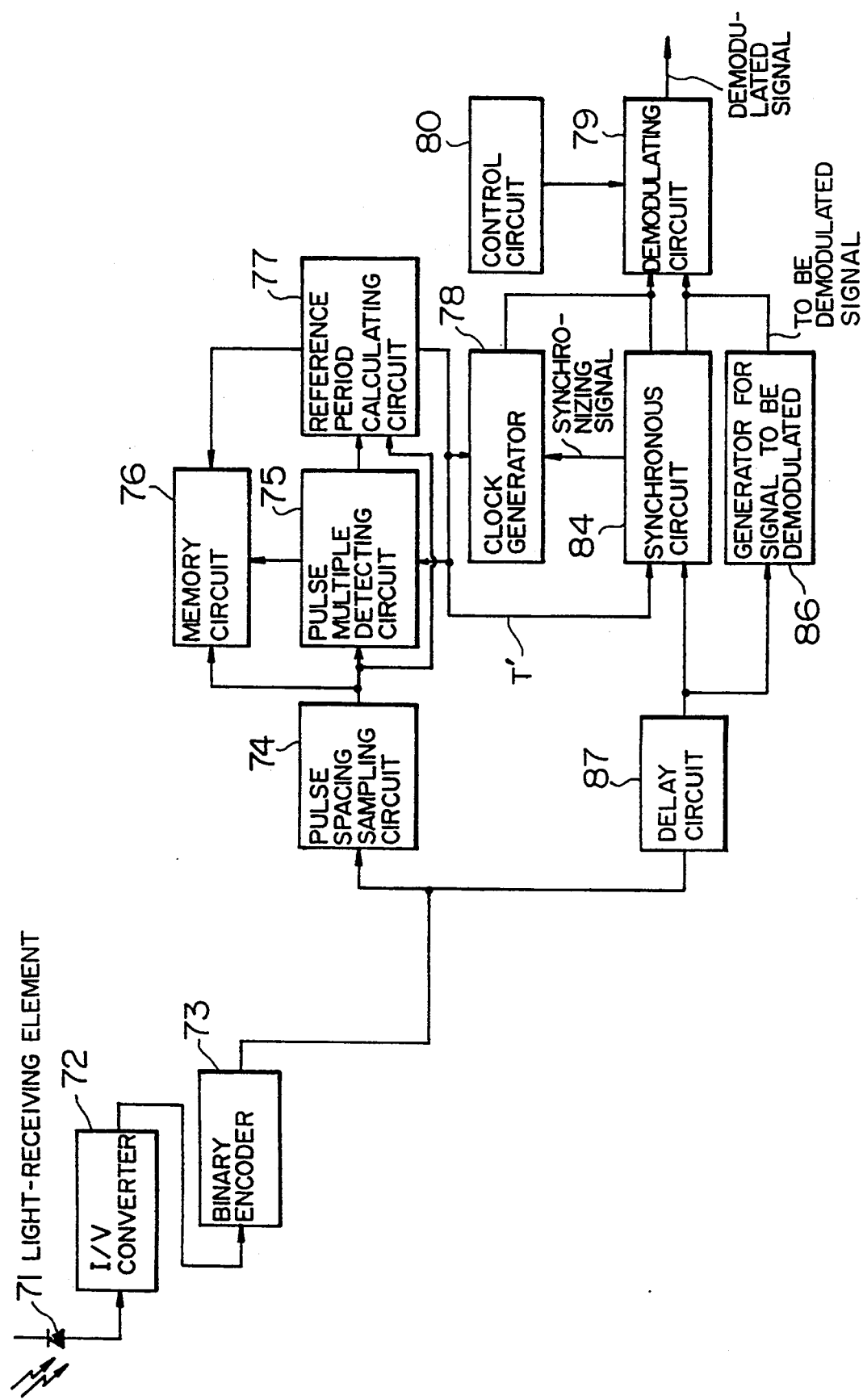
FIG. 9 is a block diagram of a bit clock regenerating circuit relating to the second embodiment.

FIG. 9 is a block diagram of a bit clock regenerating circuit relating to the second embodiment of the present invention.

In the first embodiment, two regenerating light spots are formed, and two light receiving elements are installed to receive light reflected from these light spots. This construction provides two binary-coded signals having a time difference between them; that is, two binary-coded signals one of which lags behind. In the second embodiment, two regenerating light spots are not, especially, formed, but a delay circuit is included. Nevertheless, the second embodiment provides the same operation and advantages as the first embodiment.

In this embodiment, as shown in FIG. 9, a delay circuit 87 is included to substitute for the light receiving element 81 (for example, the light receiving elements 54 to 56), I/V converter 82, binary encoder 83, and selector 85, which are included in the first embodiment. That is to say, in the first embodiment having the aforesaid construction, a current binary-coded signal is used to produce another binary-coded signal that lags behind. In the second embodiment, the delay circuit 87 is used to produce a binary-coded signal that lags behind similarly. The other components identical to those in the first embodiment are assigned the same numerals. The components and the operation identical to that in the first embodiment will not be described.

A binary-coded signal that the binary encoder 73 outputs is fed to the pulse spacing sampling circuit 74 and to the delay circuit 87. The delay circuit 87 delays, as shown in FIG. 5, the binary-coded signal by a given delay t, and outputs the delayed signal to the synchronous circuit 84 and to the circuit for generating a signal to be demodulated 86. Thus, the recording/regenerating apparatus of this embodiment has a single light source, and uses the delay circuit 87 to produce a succeeding binary-coded signal. This obviates the light receiving elements 54 to 56. The light receiving elements 54 to 56, however, are required when verification should be performed similarly to that in the first embodiment. Consequently, this embodiment can apply to either a dual light source type apparatus or a single light source type optical information recording/regenerating apparatus.

The other compositions, operation, and advantages are identical to those of the first embodiment.

In the present invention, it will be apparent that a wide range of different working modes will be formed on the basis of this invention without departing from the spirit and scope of the invention. This invention is limited to the appended claims but not restricted to any specific working modes.

What is claimed is:

1. An information regenerating apparatus for an optical recording medium that includes an information regenerating light spot forming means which forms two information regenerating light spots in the direction of extension of tracks on an optical recording medium, comprising:
   a first information regenerating light receiving element for receiving light reflected from one of said two information regenerating light spots and a second information regenerating light receiving element for receiving light reflected from the other information regenerating light spot, which are arranged at positions on a photodetector which correspond to said two information regenerating light spots;
   a reference period calculating means that calculates a reference period of information recorded on said optical recording medium using an output of said first information regenerating light receiving element which generates preceding information;
   a clock generating means that generates a bit clock with a reference period calculated by said reference period calculating means; and
   a demodulating means that demodulates information using a pulse train based on an output of said second information regenerating light receiving element and said bit clock provided by said clock generating means.

2. An information regenerating apparatus for an optical recording medium according to claim 1, further comprising a selecting means that selects destinations for an output of said first information regenerating light receiving element and an output of said second information regenerating light receiving element, and switches the destinations, according to the direction of reciprocation of an optical recording medium.

3. An information regenerating apparatus for an optical recording medium according to claim 1,
   wherein said reference period calculating means calculates a sum between a current pulse spacing, which is supplied by a pulse spacing sampling means that counts a pulse spacing of each pulse of a pulse train of said first signal, and previous pulse spacings existent in a memory means, wherein said reference period calculating means also calculates a sum between a current multiple, which is supplied by a pulse multiple detecting means that computes how many times the pulse spacing is as long as a period, and previous multiples existent in the memory means, divides a sum of pulse spacings by a sum of multiples to calculate a new average period, then supplies said new average period to said clock generating means.

4. An information regenerating apparatus for an optical recording medium according to claim 3, wherein said clock generating means uses an average period provided by said reference period calculating means and a synchronizing signal provided by a synchronizing means to generate a bit clock for use in demodulating a pulse train.

5. The information generating system of claim 2 wherein said reference period calculating means uses pulses from a time period of the output of said first light receiving element to calculate said reference period and said second signal corresponds to a pulse from about the middle of said time period such that the reference period is based on pulses both preceding and succeeding the pulse of the output of said second light receiving element which is being demodulated.

6. An information regenerating apparatus for an optical recording medium comprising:

means for producing first and second signals from different points on the same track such that the second signal represents a delayed version of the first signal;

a reference period calculating means that uses the first signal to calculate a reference period of information recorded on the optical recording medium;

a clock generating means that generates a bit clock with a reference period calculated by said reference period calculating means and;

a demodulating means that demodulates the second signal using the bit clock generated by said clock generating means.

7. The information generating apparatus of claim 6 wherein said means for producing a first and second signal consists of first and second information regenerating light spots and first and second receiving elements arranged in that position on a photodetector corresponding to the information regenerating light spots.

8. The information generating apparatus of claim 6 wherein said means for producing a first and second signal consists of an information regenerating light spot means, a receiving element which produce said first signal and, a time difference generating means which delays said first signal to create said second signal.

9. An information regenerating apparatus for an optical recording medium according to claim 6, wherein said optical recording medium is an optical card that reciprocates to regenerate information.

10. An information regenerating apparatus for an optical recording medium comprising:

means for producing first and second signals from different points on the same track such that the second signal represents a delayed version of the first signal;

a reference period calculating means that uses the first signal to calculate a reference period of information recorded on the optical recording medium;

a clock generating means that generates a bit clock with a reference period calculated by said reference period calculating means and;

a demodulating means that demodulates the second signal using the bit clock generated by said clock generating means;

wherein said reference period calculating means calculates the sum between a current pulse spacing, which is supplied by a pulse spacing sampling means that counts a pulse spacing of each pulse of a pulse train of said first signal, and previous pulse spacings existent in a memory means, also calculates the sum between a current multiple, which is supplied by a pulse multiple detecting means that computes how many times the pulse spacing is as long as a period, and previous multiples existent in the memory means, divides the sum of pulse spacings by the sum of multiples to calculate a new average period, then supplies the new average period to said clock generating means.

11. An information regenerating apparatus for an optical recording medium according to claim 10, wherein said clock generating means uses an average period provided by said reference period calculating means and a synchronizing signal provided by a synchronizing means to generate a bit clock for use in demodulating a pulse train of said second signal.

12. The information generating system of claim 6 wherein said reference period calculating means uses pulses from a time period of said first signal to calculate said reference period and said second signal corresponds to a pulse from about the middle of said time period such that the reference period is based on pulses both preceding and succeeding the pulse in said second signal which is being demodulated.

* * * * *